(12) United States Patent
Scherzer

(10) Patent No.: US 7,608,935 B2
(45) Date of Patent: Oct. 27, 2009

(54) METHOD AND SYSTEM FOR GENERATING ELECTRICITY UTILIZING NATURALLY OCCURRING GAS

(76) Inventor: Paul L. Scherzer, 130 Spring Park Dr., Suite 200, Midland, TX (US) 79705

( * ) Notice: Subject to any disclaimer, the term of this patent is extended or adjusted under 35 U.S.C. 154(b) by 249 days.

(21) Appl. No.: 10/576,458

(22) PCT Filed: Oct. 22, 2004

(86) PCT No.: PCT/US2004/035200

§ 371 (c)(1),
(2), (4) Date: Feb. 12, 2007

(87) PCT Pub. No.: WO2005/041396

PCT Pub. Date: May 6, 2005

(65) Prior Publication Data

US 2007/0120367 A1   May 31, 2007

Related U.S. Application Data

(60) Provisional application No. 60/513,474, filed on Oct. 22, 2003, provisional application No. 60/549,380, filed on Mar. 2, 2004.

(51) Int. Cl.
*F03B 13/10* (2006.01)
*F03B 13/00* (2006.01)

(52) U.S. Cl. ....................................................... 290/43
(58) Field of Classification Search .................... 290/43
See application file for complete search history.

(56) References Cited

U.S. PATENT DOCUMENTS

| 2,975,607 | A | | 3/1961 | Bodle | 62/50.2 |
|---|---|---|---|---|---|
| 3,068,659 | A | | 12/1962 | Marshall, Jr | 62/50.3 |
| 3,183,666 | A | | 5/1965 | Jackson | 60/772 |
| 3,479,832 | A | | 11/1969 | Sarsten et al. | 62/50.3 |
| 3,726,085 | A | | 4/1973 | Arenson | 60/772 |
| 3,892,103 | A | | 7/1975 | Antonelli | 62/532 |
| 4,036,028 | A | | 7/1977 | Mandrin | 62/50.3 |
| 4,086,758 | A | * | 5/1978 | Harboe | 60/780 |
| 4,220,009 | A | * | 9/1980 | Wenzel | 60/648 |
| 4,329,842 | A | * | 5/1982 | Hoskinson | 60/39.465 |
| 4,372,124 | A | | 2/1983 | Newton et al. | 60/648 |
| 4,437,312 | A | | 3/1984 | Newton et al. | 60/648 |
| 4,479,350 | A | | 10/1984 | Newton et al. | 60/655 |
| 4,599,868 | A | | 7/1986 | Lutjens et al. | 62/48.4 |
| 4,995,234 | A | | 2/1991 | Kooy et al. | 60/648 |
| 5,457,951 | A | | 10/1995 | Johnson et al. | 60/780 |
| 5,606,858 | A | * | 3/1997 | Amir et al. | 60/648 |
| 5,628,191 | A | * | 5/1997 | Kueck et al. | 60/655 |
| 5,685,154 | A | * | 11/1997 | Bronicki et al. | 60/648 |
| 6,089,028 | A | | 7/2000 | Bowen et al. | 62/50.2 |
| 6,374,591 | B1 | | 4/2002 | Johnson et al. | 60/783 |
| 6,824,347 | B2 | * | 11/2004 | Maloney | 415/1 |
| 6,993,913 | B2 | | 2/2006 | Kobayashi et al. | 60/736 |
| 7,562,708 | B2 | * | 7/2009 | Cogliandro et al. | 166/248 |
| 2004/0126223 | A1 | * | 7/2004 | Maloney | 415/1 |
| 2006/0076076 | A1 | | 4/2006 | Darling, IV et al. | 141/82 |
| 2006/0174627 | A1 | | 8/2006 | McQuiggan | 60/772 |
| 2008/0128029 | A1 | * | 6/2008 | Gorman | 137/209 |
| 2009/0084132 | A1 | * | 4/2009 | Dragomir et al. | 62/613 |

(Continued)

*Primary Examiner*—Nicholas Ponomarenko
*Assistant Examiner*—Pedro J Cuevas
(74) *Attorney, Agent, or Firm*—Tucker Ellis & West LLP

(57) ABSTRACT

A system and method for using natural gas to generate electricity. Natural gas under pressure is withdrawn from a well and passed to a turbine. The pressure of the natural gas acts on a turbine fan that in turn drives a generator to generate electricity. The natural gas used to drive the turbine fan suitably is reused to drive another turbine and generator, thereby producing additional electricity.

12 Claims, 6 Drawing Sheets

U.S. PATENT DOCUMENTS

2009/0095155 A1* 4/2009 Frydman et al. .............. 95/172
2009/0100754 A1* 4/2009 Gil ............................. 48/201
2009/0100822 A1* 4/2009 Osakabe et al. .......... 60/39.281
2009/0173073 A1* 7/2009 Guidati et al. ................ 60/670

* cited by examiner

METHOD AND SYSTEM FOR GENERATING ELECTRICITY UTILIZING NATURALLY OCCURRING GAS

CROSS-REFERENCE TO RELATED APPLICATIONS

This application claims priority to U.S. Provisional Application No. 60/513,474, filed Oct. 22, 2003, entitled, "A Method and System for Generating Electricity Utilizing Naturally Occurring Gas", and U.S. Provisional Application No. 60/549,380, filed Mar. 2, 2004, entitled, "System and Method for Producing Electricity Using Natural Gas", the entirety of which are hereby incorporated by reference herein

BACKGROUND OF THE INVENTION

The present invention generally relates to the generation of electricity using naturally occurring gas. More particularly, this invention is directed to a system and method for the generation of electricity using naturally occurring gas to drive a turbine and generator.

Electricity is vital to the economy and daily life due to the heavy reliance on devices that require electricity to function. Accordingly, a constant source of electricity sufficient to meet the ever-increasing demands of the consuming public is a critical component for daily operations. As the population has increased, the use of electricity-driven machines has also increased, thereby further increasing electricity demand. Such demand and general lack of supply has caused severe problems, including blackouts, power outages, brownouts, etc.

Several types of renewable energy sources are conventionally used for electricity and power generation. Hydroelectric power plants use water, either naturally flowing or forced through a dam, to drive large generators and account for roughly 9% of the U.S. energy production. However, the location of these plants is limited to those areas having naturally occurring bodies of water. Geothermal power plants use steam created by water and magma to generate electricity. However, locating and securing a constant source of steam thus generated is difficult and not widely available. Solar power, however, is becoming more prevalent as an alternative means for generating electricity. Photovoltaic cells directly translate solar energy into electricity. However, even the most advanced photovoltaic cells do not exceed generally 15-20% efficiency and are only useful to the extent that sunlight is available.

Another source of renewable energy is wind power. Massive propellers, powered by the wind, rotate in large wind farms and generate electricity by driving generators. The use of wind power to generate electricity is becoming more common. However, similar to solar power, weather conditions can affect output and blackouts may occur due to slow wind periods. Still another source of renewable energy that has not seen great production of electricity is the use of biomass to fire boilers, thereby generating steam. Biomass generally includes wood, agriculture, biological wastes and other refuse that may be burned in large furnaces for generating the heat necessary to create steam for powering turbine generators.

Turbines are frequently used to generate electricity. In general, a turbine translates a received force into a rotational energy. The rotational energy is then transferred to an associated generator that translates the rotational energy into a raw form of electricity available to a transformer or other suitable device for consumption and use.

The force received by the turbine is any of a suitably plurality of forces, such as a steam force. A steam force suitably is generated by burning a fuel in a furnace, thereby converting water to steam. The steam is transferred to the turbine where it causes a turbine fan to rotate and thereby generate the rotational energy. The fuel burnt in the furnace is any of a suitable plurality of fuels, including flammable natural gas, petroleum, oil, coal, etc. However, most suitable fuels are non-renewable natural resources. Accordingly, there is a need for a system and method for generating electricity that more efficiently utilizes fuel.

SUMMARY OF THE INVENTION

In accordance with the present invention, disclosed is a system and method for more efficiently producing electricity through the use of natural gas.

In accordance with one aspect, the present invention teaches a system for using natural gas to produce electricity. The system includes a well adapted for withdrawing pressurized natural gas, such as a flammable natural gas, from a naturally occurring source of natural gas. The pressurized natural gas is used to drive a turbine and an associated generator to produce electricity. Additionally, the pressurized natural gas used to drive the turbine is suitably recovered and used to drive additional turbines and associated generators.

In one embodiment, the system is adapted to use natural gas containing little or no amounts of carbon dioxide and/or nitrogen. According to another embodiment, the system is adapted to use natural gas containing large amounts of carbon dioxide and/or nitrogen. The system suitably includes a separator adapted for separating the carbon dioxide and/or nitrogen from the natural gas before the natural gas is used by the additional turbine and generator to produce electricity.

In an alternate embodiment of the present invention, the present invention produces the carbon dioxide or nitrogen to utilize the powerful flow of the gas to turn the blades of a turbine or a series of turbines. To produce the carbon dioxide or nitrogen, a well will be drilled into the reservoir. The produced gas will be flowed through a pipeline into the nearby turbine or series of turbines, which are encased in a sealed container to prevent leakage into the atmosphere. The flow of gas will turn the turbine blades, which then turn the shaft. The turbine shaft is connected to the generator and turns the rotors to create electricity.

In accordance with yet another aspect, the present invention teaches a method for using natural gas to produce electricity. The method generally includes the steps of withdrawing pressurized natural gas from a well, driving a turbine with the pressurized natural gas, driving a generator associated with the turbine and generating electricity through the driving of the generator. The method suitably also includes the steps of transferring the natural gas from the turbine and driving additional turbines and generators to produce additional energy. The method is adapted to be implemented with natural gas containing either little or large amounts of nitrogen and/or carbon dioxide.

Still further, in accordance with the present invention, there is provided a system for exploiting power from a pressurized gas reservoir. The system includes means adapted for receiving gas at that is pressurized at a first pressure level from a first portion of an associated gas reservoir system and means adapted for directing the pressurized gas to a turbine so as to induce motion thereof. The system also includes a generator, mechanically coupled to the turbine, the generator including means for generating an electrical current induced from motion of the turbine. The system further includes means adapted for directing the gas from the turbine, after passage therethrough, to a second portion of the associated gas reservoir system at a secondary pressure level less than that of the first associated gas reservoir, and means adapted for using at least a portion of the electrical current to drive an associated compressor, which compressor includes means for increasing the secondary pressure level.

In a preferred embodiment, the system further includes means adapted for directing gas at the secondary pressure level to an associated combustion generator so as to generate additional electrical current from combustion thereof and means adapted for directing the additional electrical current to the compressor so as to further increase the secondary pressure level. The further increase of the secondary pressure level is at least that of the first pressure level, and the first and second portions of the gas reservoir system are in direct mutual fluid communication.

Further, in accordance with the present invention, there is provided a method for exploiting power from a pressurized gas reservoir. The method includes the steps of receiving gas at that is pressurized at a first pressure level from a first portion of an associated gas reservoir system and directing the pressurized gas to a turbine so as to induce motion thereof. The method also includes the steps of generating, at a generator mechanically coupled to the turbine, an electrical current induced from motion of the turbine, and directing the gas from the turbine, after passage therethrough, to a second portion of the associated gas reservoir system at a secondary pressure level less than that of the first associated gas reservoir. At least a portion of the electrical current is then used to drive an associated compressor, which compressor includes means for increasing the secondary pressure level.

In a preferred embodiment, the method also includes the steps of directing gas at the secondary pressure level to an associated combustion generator so as to generate additional electrical current from combustion thereof, and directing the additional electrical current to the compressor so as to further increase the secondary pressure level. The further increase of the secondary pressure level is at least that of the first pressure level and the first and second portions of the gas reservoir system are in direct mutual fluid communication.

Additional objects, advantages and novel features of the invention will be set forth in part in the description which follows, and in part will become apparent to those skilled in the art upon examination of the following or may be learned by practice of the invention. The objects and advantages of the invention may be realized and attained by various structures and methods as covered by the patent claims.

BRIEF DESCRIPTION OF THE DRAWINGS

The accompanying figures incorporated in and forming a part of the specification, illustrate several aspects of the present invention, and together with the description serve to explain the principles of the invention. In the figures.

DETAILED DESCRIPTION OF PREFERRED EXAMPLE EMBODIMENTS OF THE PRESENT INVENTION

The present invention is directed to a system and method for using natural gas to generate electricity. In general, energy is generated by directing the flow pressure of a naturally occurring deposit of natural gas to drive a turbine and generator. Upon driving the turbine and generator, the natural gas is suitably recovered and sent to a transmission pipeline for delivery to end users or is suitably used to drive at least one additional turbine and generator. Alternatively, the natural gas is sent to a compressor, which compresses the natural gas before it is transmitted to a second reservoir. Accordingly, the system is adapted to use the natural gas at least once to generate electricity before the natural gas is delivered for subsequent use and/or sale. The system and method are adapted to use both natural gas containing a small or no amount of nitrogen or carbon dioxide and natural gas containing a large amount of nitrogen or carbon dioxide.

Figure 1C:
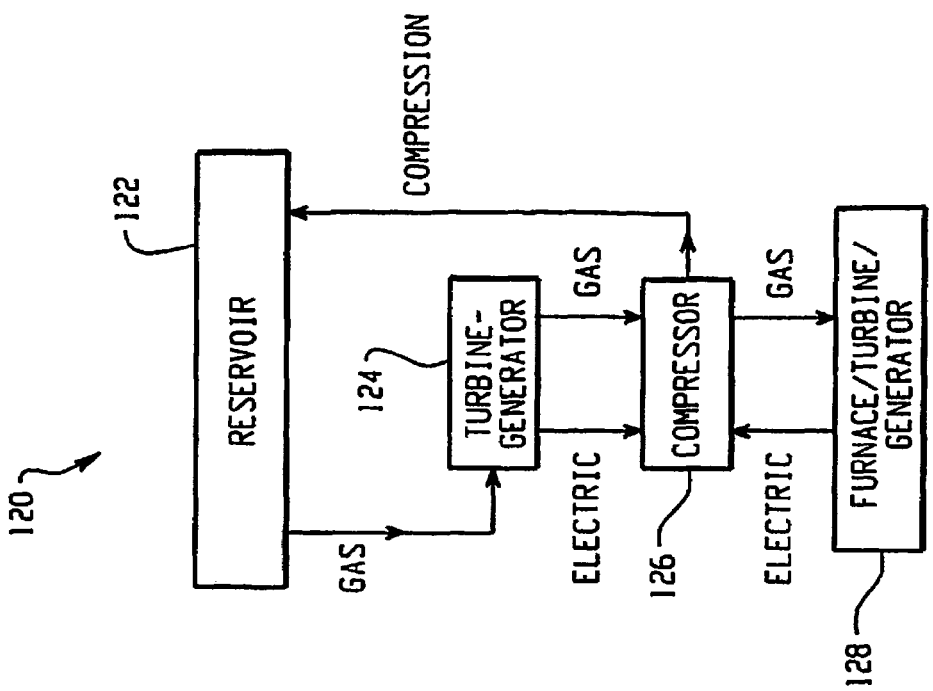
FIG. 1 is a block diagram illustrative of the system embodiments of the present invention.
Figure 1B:
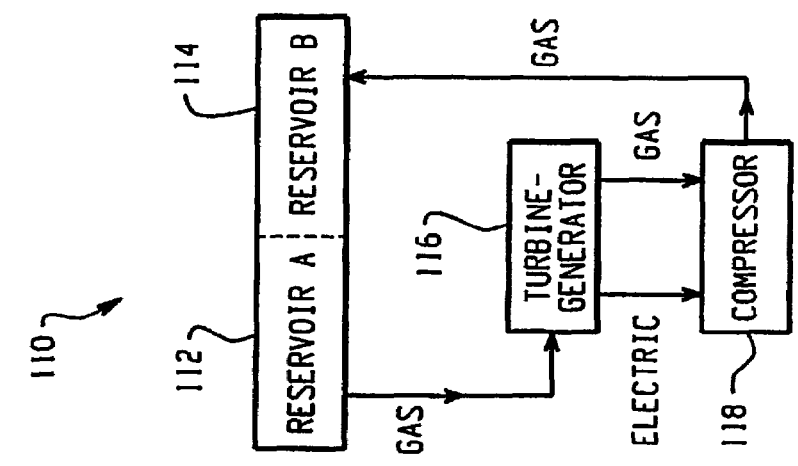
Figure 1A:
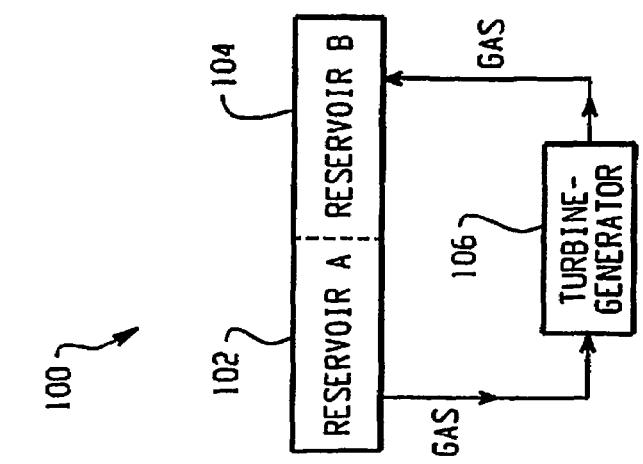

With reference to FIGS. 1A-1C, illustrated are basic block diagrams illustrating the operation of the present system in its preferred embodiments. Figure 1A illustrates a system 100 for using a naturally occurring gas under pressure to turn a turbine/generator. The gas recovered from reservoir A 102, i.e., the natural deposit, is then passed through the turbine blades which spin a shaft connected to a generator 106. Electrical energy is thereby generated and the gas is transmitted from the turbine 106 to reservoir B 104. Reservoir B 104 is suitably a second chamber of the naturally occurring gas deposit, albeit at a lesser pressure than that of reservoir A 102, or an artificially generated chamber or device that maintains the pressure of the gas that has passed through the turbine blades. The skilled artisan will appreciate that the gas subsequently stored in reservoir B 104 is advantageously available for sale or other use in addition to the generation of electricity.

The system 110 of FIG. 1B incorporates a compressor 118, in order to increase the pressure of reservoir B 114 for later use or sale. Gas recovered from the initial deposit of reservoir A 112 is passed through the turbine 116, as described above, and instead of immediately proceeding to reservoir B 114, a compressor 118, deriving power from the generator 116, compresses the expelled gas prior to transmitting the gas to reservoir B 114. The skilled artisan will appreciate that the increase in available pressure of reservoir B 114 as a result of the compressor facilitates easier transport of the gas and more efficient storage of the gas.

FIGS. 1A and 1B are equally capable of using flammable or non-flammable gases as the driving force of the turbines. However, only flammable gas is readily applicable to the system 120 illustrated in the block diagram of FIG. 1C. In FIG. 1C, only a single reservoir 122 is shown. There is no need for an additional reservoir because the gas recovered from the reservoir under pressure is kept pressurized by a compressor 126. The compressor 126 of FIG. 1C is supplied with power from the gas pass-through design of the first generator 124 and a portion of the gas passed through is then burned in a furnace to heat water to steam, thereby spinning the turbine of a second generator 128. The combined power of both generators 124, 128 enables maintaining the pressure of the reservoir 122.

Figure 2:
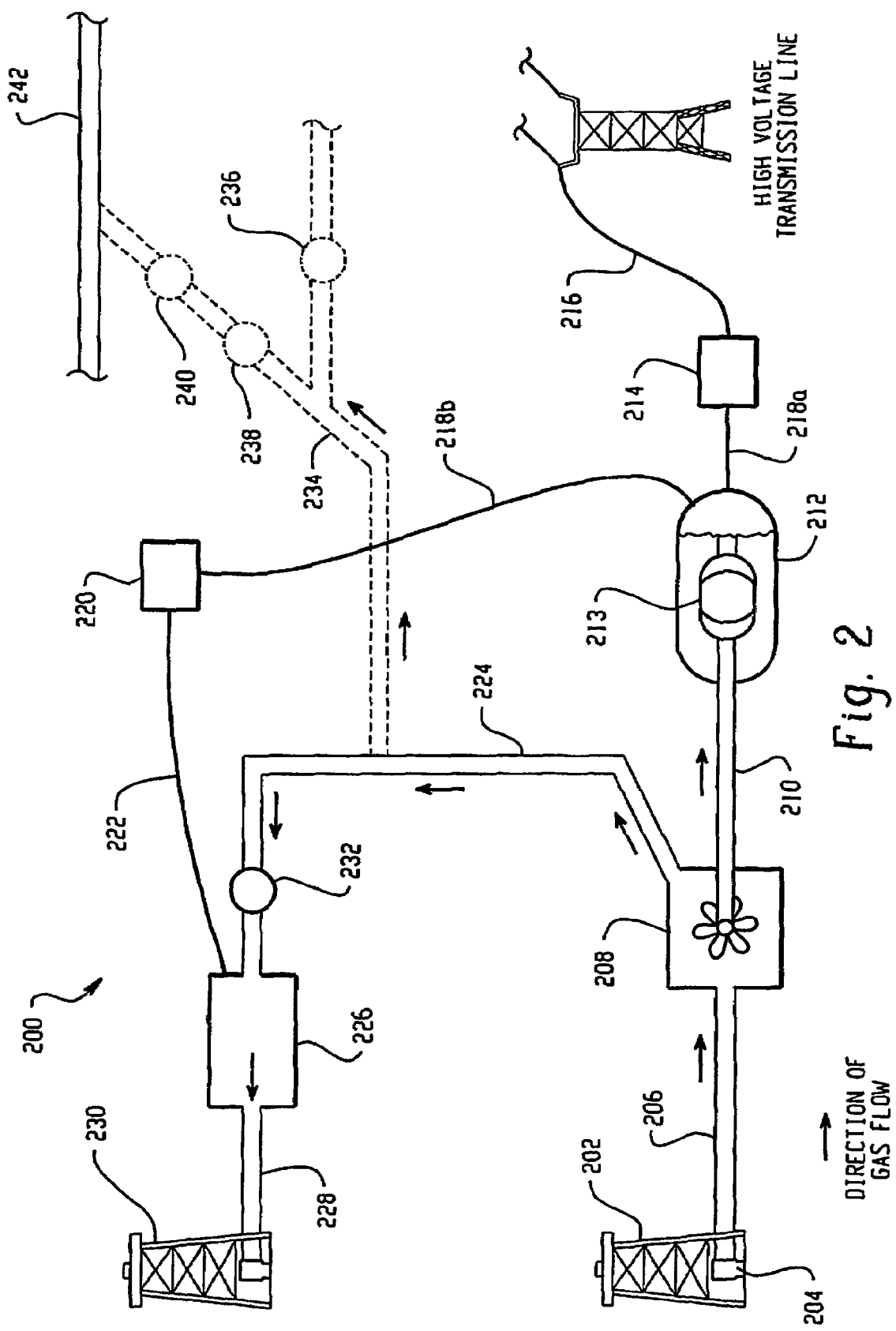
FIG. 2 is a diagram illustrative of the system of the present invention utilizing a single turbine.
Figure 3:
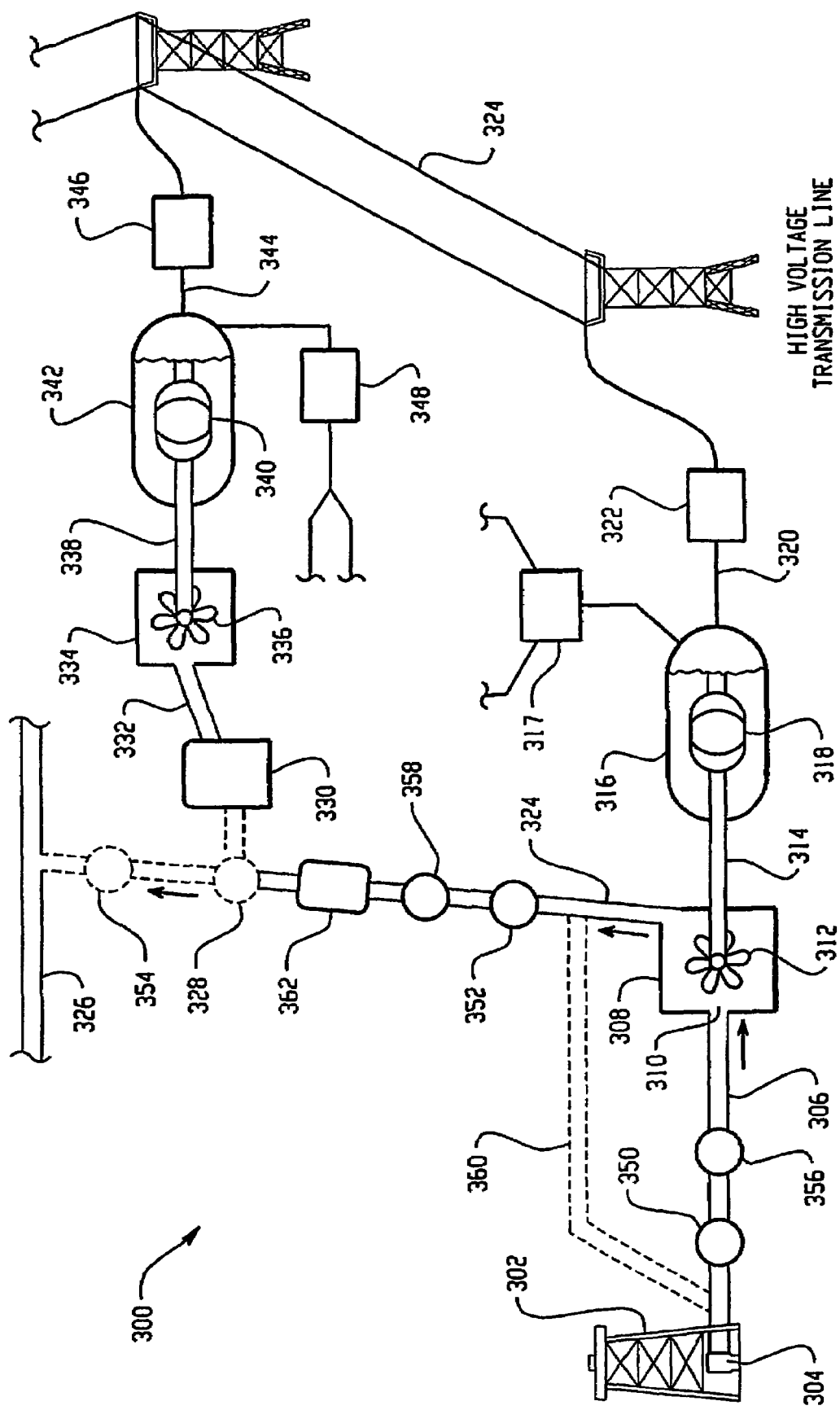
FIG. 3 generally illustrates an example configuration of components of the electricity-generating system of the present invention.
Figure 4:
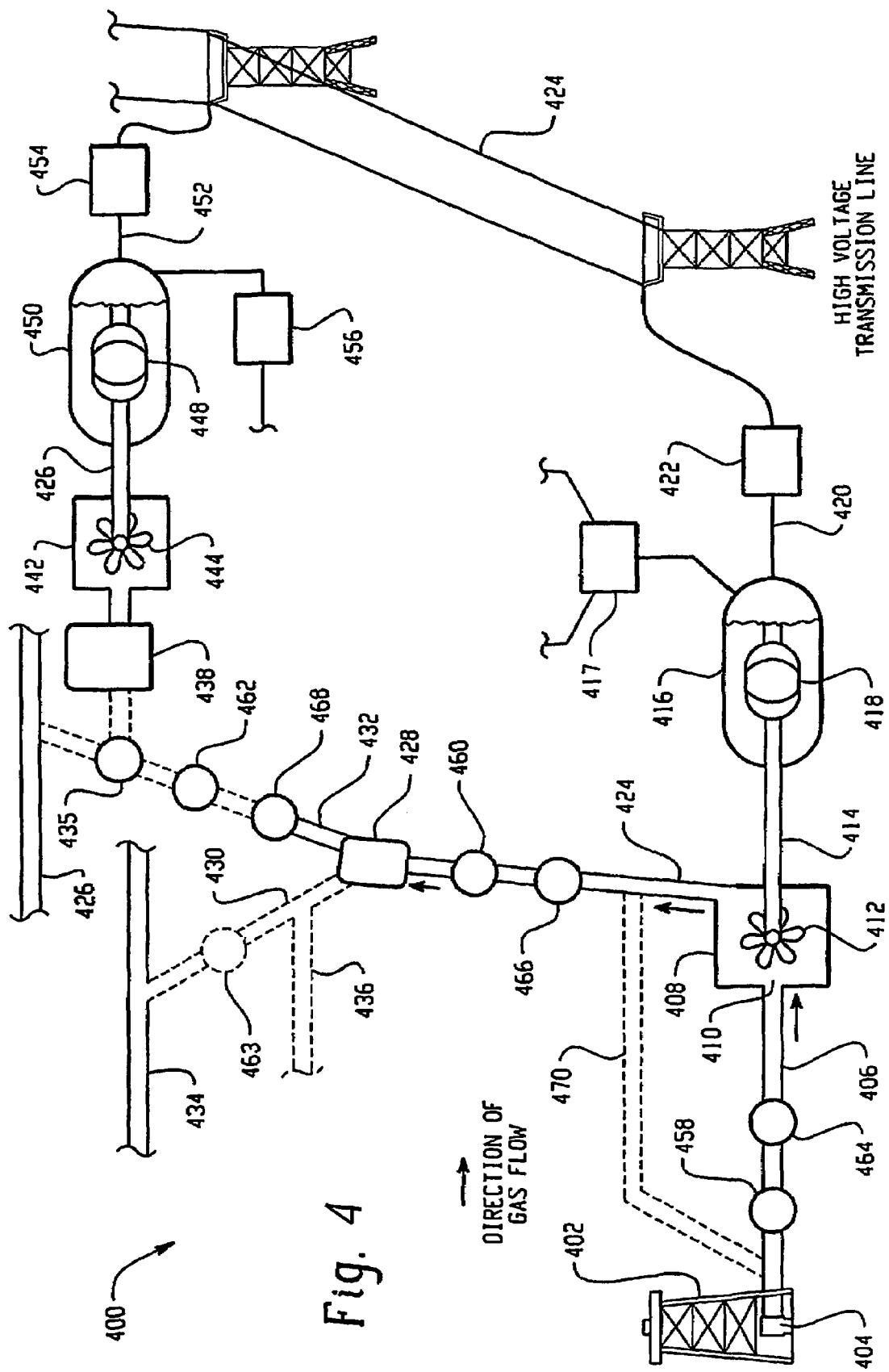
FIG. 4 generally illustrates an example of an alternate configuration of components of the electricity-generating system of the present invention.

As will be appreciated by one skilled in the art, the foregoing descriptions of several implementations of the subject invention, using both flammable and non-flammable gas deposits will be better understood when view in conjunction with the systems illustrated in FIGS. 2, 3 and 4. FIG. 2 illustrates the use of a non-flammable naturally occurring gas for electricity generation, while FIGS. 3 and 4 illustrate the use of a flammable natural gas for electricity generation.

Referring now to FIG. 2, there is shown a system diagram of the present invention as implemented in a single turbine to generator configuration. One of skill in the art will appreciate that the following description utilizes the naturally occurring pockets of carbon dioxide or nitrogen to turn the turbine, any naturally occurring gas under pressure may be used. A large reservoir of naturally occurring gas (not shown) is located below the producing well 202. A wellhead (not shown) is fitted with a cutoff valve 204 to prevent the loss of pressure of the reservoir, as well as implemented for safety considerations. Coupled to the wellhead, there is a pipe 206 to transport the gas from the producing well 202 to the turbine 208. The pipe 206 is suitably adapted to contain the high pressures associated with the reservoir and may be composed of any material capable of handling the high pressures and low temperatures inherent with such high pressure gases, such as steel. It will be appreciated by those skilled in the art that the diameter of the pipe 206 is to be suitably adapted to allow for pressure enough to spin the turbine 208, while prevent rupture of the pipe 206 itself.

As shown at the turbine 208, there is a shaft 210 that is suitably coupled to a generator 212. The shaft 210 turns the rotor 213 of the generator 212 to generate electricity. The electricity generated by the generator 212 is transmitted via line 118a to a step up transformer 214. The operations of a transformer are well known in the art. The transformer 214 steps up the voltage received from the generator 212 via line 218a to a voltage capable of transmission on the high voltage lines 216. It will be appreciated by those skilled in the art that the methods for transmission of electricity are well known. The electricity thus generated is transmitted over the high voltage transmission lines 216 to substations (not shown) and finally to the user.

As contemplated by the present invention, in order to facilitate the recovery of the gas used to drive the turbine 208, the system thus described allows for the transmission of the used gas through a pipe 224 to a compressor 226. It will be understood by those of ordinary skill in the art that the pipe 224 will be composed of a suitably adapted material capable of carrying gas without leaking such gas into the outside environment. Furthermore, the person of ordinary skill in the art will appreciate that the composition of the pipe 224 will be of similar size and manufacture to that of pipe 206. The compressor 226 allows for the recompression of the gas recovered from the reservoir to a pressure capable of being reintroduced into the reservoir. The inclusion of the compressor 226 enables the system to maintain the high pressure of the reservoir for future operation of the turbine 208.

The compressor 226 is suitably adapted to compress returning gas using an electric motor (not shown). Power to operate the compressor 226 is drawing directly from the generator 212 prior to the stepping up of voltage by the step up transformer 214. This electricity is transmitted from the generator 212 to the compressor 226 by means of transmission line 218b. It will be appreciated by those skilled in the art that the composition of the transmission lines 218a and 218b will be suitably adapted to carry the electricity. To facilitate ease of operation, the transmission line 218b is operatively connected to a transformer 220. The transformer 220 is suitably adapted to either step up or step down the voltage generated by generator 212, as required by the electrical motor running the compressor 226. The voltage output from the transformer 220 is then transmitted via transmission line 222 to the electrical motor of the compressor 226.

As gas is compressed in the compressor 226, it is shunted via pipe 228 to the injection well 230. The pipe 228 is suitably adapted to carry such high-pressure gas without loss to the outside environment. It will be appreciated that the compressor 226 is suitably adapted to generate the pressures required to maintain the internal pressure of the reservoir and thus keep the system operational. In one particular embodiment, a check valve (not shown) is incorporated into the wellhead (not shown) located at the injection well 230. As used herein, a check valve is intended to describe any valve known in the art that allows for the one-way transmission of a fluid or gas, thereby preventing a back-flow through the system. To put in other words, the check valve allows the reintroduced gas back into the reservoir, but does not allow gas to exit the reservoir.

A check valve 232 located at the inlet to the compressor 226 enables the system to extract the naturally occurring gas without reintroducing the gas into the reservoir. Once engaged, the check valve 232 blocks transmission of the gas to the compressor 226 and allows the gas to be collected for purposes other than electricity generation. As shown, a bypass line 234 directs the gas to either a vent line 236 or a secondary recovery line 238. The secondary recovery line 238 uses a check valve 240 to prevent the unwanted collection of vent gases. Once passed the secondary recovery line 238, the gas travels through the transmission pipeline 242 to a secondary recovery site (not shown). It will be appreciated by those skilled in the art that additional generators are capable of being added to the system 200 without departing from the present invention.

Turning now to FIG. 3, there is shown an illustrative example embodiment of the system 300 for using natural gas to generate electricity. The system 300 includes a source (not shown) of natural gas, such as a naturally occurring deposit or reservoir of natural gas under pressure, as known to one of ordinary skill in the art. The example system 300 of FIG. 3 is adapted for using a source of natural gas containing small or no amounts of nitrogen or carbon dioxide. The natural gas is suitably a flammable natural gas.

A well 302 or other suitable device is installed in an area near the source of the natural gas for accessing and withdrawing the natural gas in a controlled manner, the structure and manner of installation of which is known to one of ordinary skill in the art. The well 302 includes a wellhead 304 that operates as a conduit through which the natural gas flows and has affixed thereto a cutoff valve (not shown) adapted for maintaining the natural gas at a level of pressure and for providing safety features.

A pipe 306 is coupled to the wellhead 304 for transporting the natural gas to a turbine 308. The pipe 306 is suitably adapted for maintaining the pressure of the natural gas as received from the source and delivering the natural gas under pressure to the turbine 308, and is composed of any material suitable for handling the high pressures and low temperatures associated with the natural gas, such as steel, polyvinyl chloride (PVC), etc. Given the pressure of the transported gas, one of ordinary skill in the art will understand that the pipe 306 is of any suitable diameter as determined by various properties of the natural gas and the desired resultant effect of the transported natural gas.

The pipe 306 transports the natural gas under pressure to the turbine 108. In general, the turbine 308 is adapted to receive the pressurized natural gas, translate the pressure into a rotational energy and transfer the rotational energy to an associated generator for subsequent use by the generator in producing electricity.

The pipe 306 generally releases the pressurized natural gas into an internal cavity 310 of the turbine 308. The turbine 308 is suitably a sealed container adapted to prevent leakage of the natural gas out of the turbine. The internal cavity 310 includes a turbine fan 312 that is adapted to rotate in response to the input pressurized natural gas. The fan 312 is communicatively coupled to an elongate shaft-like cylindrical member 314 that communicates with the generator 316. The fan 312 is coupled to the shaft 314 in such a manner that the rotation of the fan 312 causes the shaft 314 to similarly rotate.

The shaft 314 of the turbine 308 is generally communicatively coupled to a rotor 318 of the generator 316. The rotation of the shaft 314 imparts a rotational energy to the generator rotor 318, which rotational energy is subsequently harnessed by the generator 316 to produce electricity, as known to one of ordinary skill in the art. The produced electricity is transmitted from the generator 316 via an electricity transmission line 320 to a transformer 322. In general, the transformer 322 is adapted for stepping up the voltage of the electricity received from the generator 316 so that the electricity is in a form suitable for transmission along a high voltage line 324, thereby making the electricity available to substations (not shown) and ultimately consuming devices. The generator 316 is also suitably adapted to transmit an amount of the generated electricity to an alternate transformer 317 for subsequent on-site usage.

Returning to the turbine 308, the turbine suitably includes a pipe-like conduit 324 adapted for releasing the natural gas that already acted on the turbine fan 312 to a gas transmission pipeline 326 for subsequent delivery of the natural gas to another location. The conduit 324 suitably includes a selectable valve-like diverter 328 for redirecting the natural gas to a second turbine and generator system, such as a steam-driven turbine and generator system, which is also adapted for using the natural gas to produce electricity.

With further reference to FIG. 3, the flow of the natural gas suitably passes from the conduit 324 and valve 328 to a furnace 330 upon appropriate orientation of the valve 328. The furnace 330 is generally adapted to burn the received natural gas as a fuel, thereby converting water into steam. The generated steam travels from the furnace 330 via a steam conduit 332 to a turbine 334. In general, the turbine 334 is a steam-driven turbine such that the turbine 334 is adapted to receive and translate a steam force. The received steam acts on a turbine fan 336 housed within the turbine 334. The fan 336 rotates in response thereto and imparts a rotational force onto an elongate shaft-like cylindrical member 338, as previously described. A rotor 340 housed within a generator 342 associated with the turbine 334 is communicatively coupled to the shaft 338, such that the rotation of the shaft 338 causes the rotor 340 to similarly rotate and generate electricity thereby, as also previously described. The generated electricity is transferred via an electricity transmission line 344 to a transformer 346 for preparing the electricity for subsequent transmission to the high voltage line 324. The generator 342 is suitably adapted to transmit an amount of the generated electricity to an alternate transformer 348 for subsequent on-site usage.

Thus, the system 300 as described hereinabove suitably enables a quantity of natural gas to be used more than once in generating electricity. FIG. 3 illustrates the system 300 as adapted to pass a quantity of natural gas through two turbine and generator systems, thereby producing more electricity than if only one turbine and generator system were used. It will be appreciated that the system 300 is scalable such that more than two turbine and generator systems are suitably implemented to further increase the amount of electricity generated with a quantity of natural gas.

Depending on the particular configuration and layout of the system 300, the system 300 suitably includes at least one compressor for maintaining a level of pressure of the natural gas within the system 300. For example, a compressor 350 is suitably integrated with the pipe 306 for ensuring that the natural gas is delivered to the turbine 308 under pressure. As another example, a compressor 352 is suitably integrated with the conduit 324 at a location upstream of the valve 328 for delivering the natural gas under pressure to the furnace 330. As yet another example, a compressor 354 is suitably integrated with the conduit 324 at a location downstream of the valve 328 for delivering the natural under pressure to the gas transmission pipeline 326. The system 300 suitably also includes one or more chokes adapted for reducing flow pressure. In a preferred embodiment, a first choke 356 is integrated with the pipe 106 and a second choke 358 is integrated with the conduit 324 upstream of the valve 328.

The system 300 suitably also includes a bypass pipeline 360 adapted for transmitting natural gas from the well 302 directly to the conduit 324, thereby bypassing entry into the turbine 308 and generator 316. The bypass pipeline 360 is integrated with the conduit 324 at any suitable location, such as upstream from the valve 328 or downstream from the valve 328. The bypass pipeline 360 suitably includes at least one cutoff valve for controlling the flow of the natural gas through the pipeline 360.

The system is also adapted to have a separator 362 integrated with the conduit at a location upstream of the valve 328. The separator 362 is adapted to receive natural gas containing nitrogen or carbon dioxide and separate the nitrogen or carbon dioxide from the natural gas.

Turning to FIG. 4, illustrated is an example system 400 adapted for using natural gas containing a large amount of nitrogen or carbon dioxide to produce electricity. The system 400 is of any suitable configuration, such as the configuration as depicted in FIG. 3. The system 400 generally includes similar components as those which comprise the system 300 of FIG. 3. Accordingly, as appropriate, an abbreviated discussion of such components will follow with regard to FIG. 4.

The system 400 includes a source (not shown) of natural gas, such as a flammable natural gas, containing large amounts of nitrogen or carbon dioxide. A well 402 or other suitable device is installed in an area near the source of the natural gas for accessing and withdrawing the natural gas in a controlled manner. The well 402 includes a wellhead 404 that operates as a conduit through which the natural gas flows and has affixed thereto a cutoff valve (not shown) adapted for maintaining the natural gas at a level of pressure and for providing safety features.

A pipe 406 is coupled to the wellhead 404 for transporting the natural gas to a turbine 408. The pipe 406 suitably releases the pressurized natural gas into an internal cavity 410 of the turbine 408. The turbine 408 suitably is a sealed container adapted to prevent leakage of the natural gas out of the turbine and includes a turbine fan 412 adapted to rotate in response to the input pressurized natural gas. The fan 412 is communicatively coupled to an elongate shaft-like cylindrical member 414 that communicates with the generator 416 in such a manner that the rotation of the fan 412 causes the shaft 414 to similarly rotate.

The shaft 414 of the turbine 408 is generally communicatively coupled to a rotor 418 housed by the generator 416. The rotation of the shaft 414 imparts a rotational energy to the generator rotor 418, which rotational energy is subsequently harnessed by the generator to produce electricity, as known to one of ordinary skill in the art. The produced electricity is transmitted from the generator 416 via an electricity transmission line 420 to a transformer 422 for processing the electricity into a form suitable for transmission along a high voltage line 424. The generator 416 is also suitably adapted to transmit an amount of the generated electricity to an alternate transformer 417 for subsequent on-site usage.

Returning to the turbine 408, the turbine suitably includes a pipe-like conduit 424 adapted for releasing the natural gas that already acted on the turbine fan 412 to a separator 428 that is adapted for separating the nitrogen and/or carbon dioxide from the natural gas, the operation and structure of which is known to one of ordinary skill in the art. Accordingly, the separator has associated therewith at least two outlets, a nitrogen/carbon dioxide pipeline 430 and a natural gas conduit 432.

The nitrogen/carbon dioxide pipeline 430 suitable accepts the nitrogen and/or carbon dioxide separated from the natural gas and delivers it to a nitrogen/carbon dioxide transmission pipeline 434 that transmits the nitrogen and/or carbon dioxide to an additional location for subsequent use and/or sale. The pipeline 430 suitably includes a vent 436, controllable by a valve (not shown), adapted for releasing to the atmosphere at least a portion of the nitrogen and/or carbon dioxide that passes through the pipeline 430.

The separator 428 also includes the natural gas conduit 432 for receiving the separated natural gas and delivering the natural gas to another turbine and generator system, as described previously with regard to FIG. 3, or to a natural gas transmission pipeline 426 for transportation to another location. The conduct 432 suitably includes a selectable valve-like diverter 435 for directing the natural gas to either the turbine and generator or to the pipeline 426. When the natural gas is delivered to the turbine and generator, it first enters a furnace 438 where it is used as fuel to transform water into steam. The generated steam passes through a steam conduit 440 to a turbine 442. In general, the turbine 442 is a steam-driven turbine such that the steam acts on a turbine fan 444 housed within the turbine 442. The fan 444 rotates in response thereto and imparts a rotational force onto an elongate shaft-like cylindrical member 446, as previously described. A rotor 448 housed within a generator 450 associated with the turbine 442 receives the rotational force of the shaft 446 and generates electricity thereby. The generated electricity is transferred via an electricity transmission line 452 to a transformer 454 for preparing the electricity for subsequent transmission to the high voltage line 424. The generator 450 is suitably adapted to transmit an amount of the generated electricity to an alternate transformer 456 for subsequent on-site usage.

Thus, the system 400 as described hereinabove suitably enables a quantity of natural gas to be used more than once in generating electricity. FIG. 4 illustrates the system 400 as adapted to pass a quantity of natural gas through two turbine and generator systems, thereby producing more electricity than if only one turbine and generator system were used. Accordingly, it will be appreciated that the system 400 is scalable such that more than two turbine and generator systems may be implemented to further increase the amount of electricity generated with a quantity of natural gas.

Depending on the particular configuration and layout of the system 400, the system 400 suitably includes at least one compressor for maintaining a level of pressure of the natural gas within the system 400. For example, a compressor 458 is suitably integrated with the pipe 406 for ensuring that the natural gas is delivered to the turbine 408 under pressure. As another example, a compressor 460 is suitably integrated with the conduit 424 at a location upstream of the separator 428 for delivering the natural gas under pressure to the separator 428. As yet another example, a compressor 462 is suitably integrated with the conduit pipeline 432 at a location downstream of the separator 428 for delivering the natural gas under pressure to the gas transmission pipeline 426 or the furnace 438. As yet another example, a compressor 463 is suitably integrated with the pipeline 430 at a location either upstream or downstream of the vent 436. The system 400 suitably also includes one or more chokes adapted for reducing flow pressure. In a preferred embodiment, a first choke 464 is integrated with the pipe 406, a second choke is 466 integrated with the conduit 424 upstream of the separator 428, and a third choke 468 is associated with the pipeline 432.

The system 400 suitably also includes a bypass pipeline 470 adapted for transmitting natural gas from the well 402 directly to the conduit 424, thereby bypassing entry into the turbine 408 and generator 416. The bypass pipeline 470 is integrated with the conduit 424 at a suitable location upstream from the separator 428. The bypass pipeline 470 suitably includes at least one cutoff valve for controlling the flow of the natural gas through the conduit 424.

Figure 5:
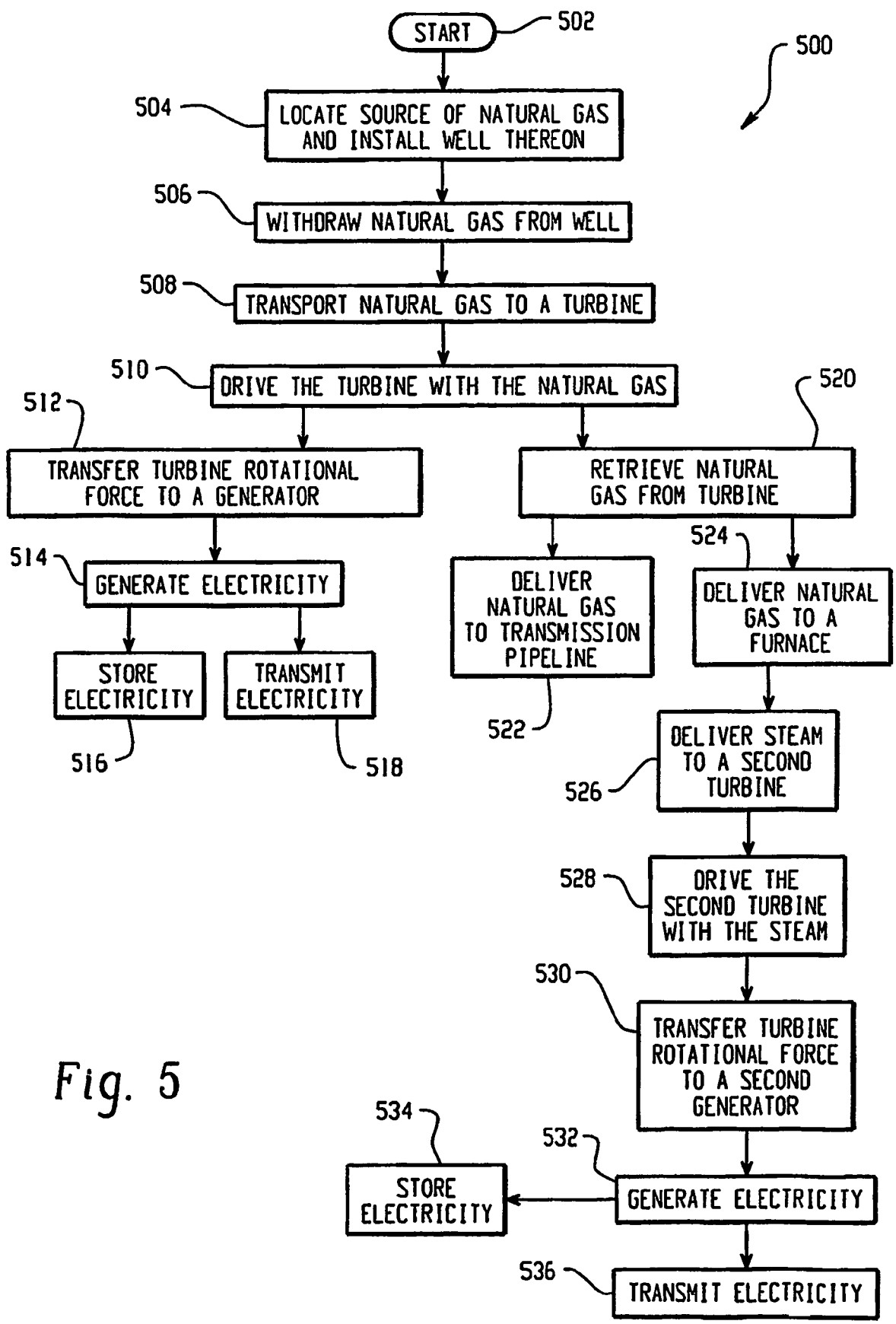
FIG. 5 is flowchart illustrating an example of a method of the present invention.

Additionally disclosed according to the present invention is a method for using natural gas containing little or no amounts of carbon dioxide and/or nitrogen to produce electricity. The method is generally implemented through the system 200 discussed above. Accordingly, an abbreviated discussion of the structure and function of the system on which the method is implemented will follow. With reference to FIG. 5, the method 500 is initiated at step 502 by locating a source of pressurized natural gas and installing a well thereon in step 504. Once the well has been installed, natural gas is withdrawn from the well at step 506 and then delivered to a turbine at step 508. As previously described with reference to the system 300, the pressure of the natural gas drives the turbine at step 510, which driving results in a rotational force being generated. At step 512, the rotational force is transferred from the turbine to the generator, wherein the generator harnesses the rotational force to generate electricity at step 514. Once the electricity has been generated, it is suitably either stored at step 516 for future usage or is suitably transmitted at step 518 to an additional site.

Returning to the step 510 wherein the natural gas drives the turbine, the method 500 is adapted to retrieve, at step 520, the natural gas from the turbine once the natural gas has driven the turbine, as previously described. Once the natural gas has been retrieved, it is suitably either delivered to a transmission pipeline at step 522 for delivery to an additional location or is suitably delivered to a furnace at step 524. After delivery to the furnace, the natural gas is consumed and thereby produces steam. The steam is delivered to a second turbine at step 526. The steam drives the second turbine at step 528 and the rotational force generated thereby is transferred to a second generator at step 530. The generator harnesses the rotational energy to generate electricity at step 532. The generated electricity is suitably either stored at step 534 or is suitably transmitted at step 536 to another location. One of ordinary skill in the art will appreciate that a more detailed understanding of the method is understandable with a reading of the discussion of the system 300.

Figure 6:
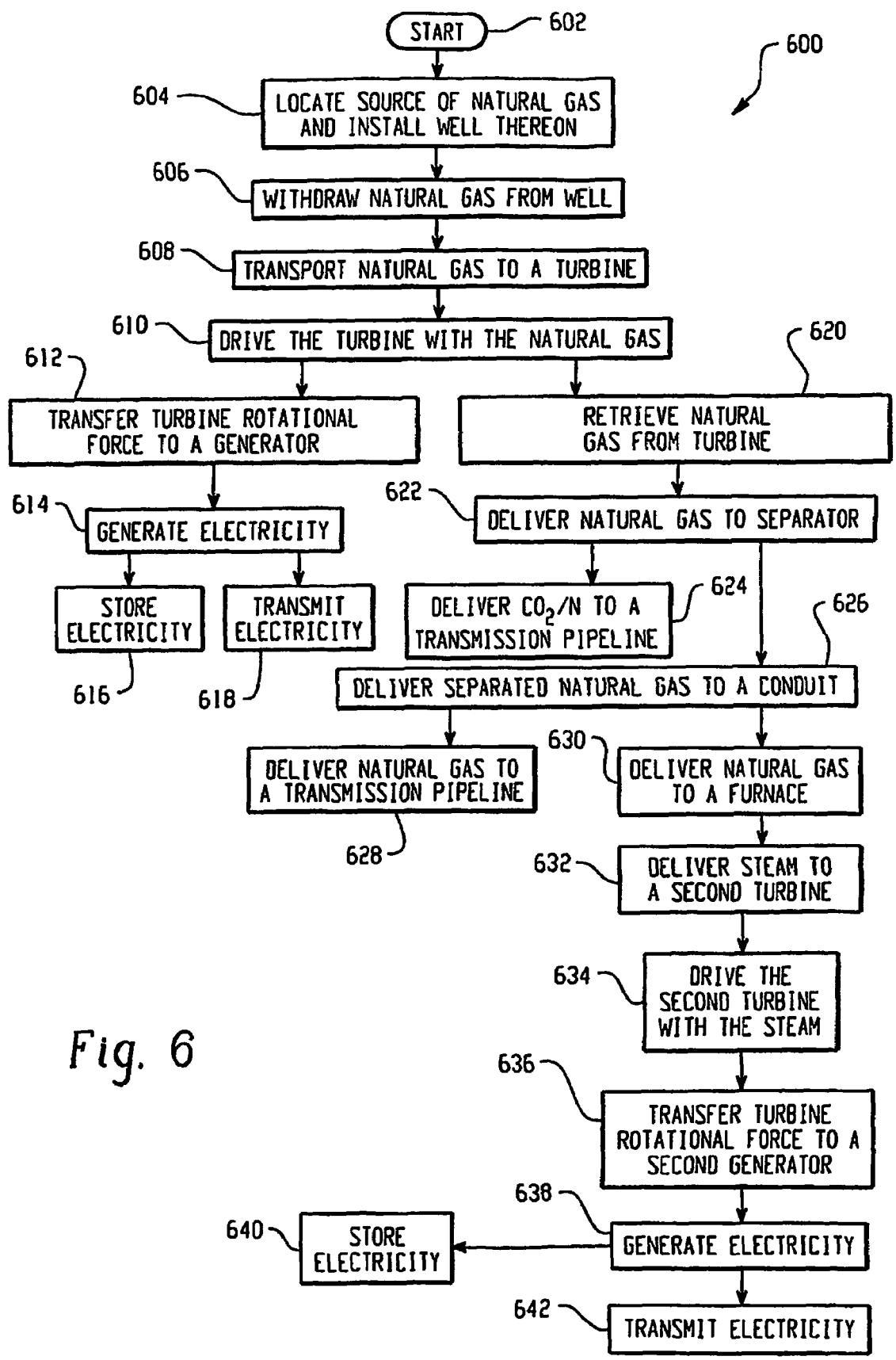
FIG. 6 is flowchart illustrating an alternate example of a method of the present invention

Additionally disclosed according to the present invention is a method for using natural gas containing large amounts of carbon dioxide and/or nitrogen to produce electricity. The method is generally implemented through the system 300 discussed above. Accordingly, an abbreviated discussion of the structure and function of the system on which the method is implemented will follow. With reference to FIG. 6, the method 600 is initiated at step 602 by locating a source of pressurized natural gas and installing a well thereon in step 604. Once the well has been installed, natural gas is withdrawn from the well at step 606 and then delivered to a turbine at step 608. As previously described with reference to the system 400, the pressure of the natural gas drives the turbine at step 410, which driving results in a rotational force being generated. At step 612, the rotational force is transferred from the turbine to the generator wherein the generator harnesses the rotational force to generate electricity at step 614. Once the electricity has been generated, it is suitably either stored at step 616 for future usage or is suitably transmitted at step 618 to an additional location.

Returning to the step 610 wherein the natural gas drives the turbine, the method 600 is adapted to retrieve, at step 620, the natural gas from the turbine once the natural gas has driven the turbine, as previously described. Once the natural gas has been retrieved, it is suitably delivered to a separator at step 622, which separator is adapted to separate the natural gas from the carbon dioxide and/or nitrogen. Once the carbon dioxide and/or nitrogen has been separated, it is delivered to a transmission pipeline at step 624 for transmission to another location. Once the natural gas has been separated from the carbon dioxide and/or nitrogen, it is delivered to a conduit at step 626. Once in the conduit, the natural gas is delivered suitably to either a natural gas transmission pipeline at step 628 for delivery to another location or to a furnace at step 630 for additional electricity generation. The natural gas is consumed in the furnace as described above and the resultant steam is delivered to a second turbine at step 632 where it is used to drive the second turbine at step 634. The rotational force generated thereby is transferred to a second generator at step 636 where it is used to generate electricity at step 638. The generated electricity is suitably either stored at step 640 or is suitably transmitted at step 642 to another location. One of ordinary skill in the art will appreciate that a more detailed understanding of the method is understandable with a reading of the discussion of the system 400.

Although the preferred embodiments have been described in detail, it should be understood that various changes, substitutions and alterations can be made therein without departing from the spirit and scope of the invention as defined by the appended claims. It will be appreciated that various changes in the details, materials and arrangements of components, which have been herein described and illustrated in order to explain the nature of the invention, may be made by those skilled in the art within the principle and scope of the invention as will be expressed in the appended claims.

What is claimed is:

1. A system for exploiting power from a pressurized gas reservoir comprising:
    means adapted for receiving naturally occurring gas that is pressurized at a first pressure level from a reservoir of naturally occurring gas;
    means adapted for directing the naturally occurring pressurized gas to a turbine so as to induce motion thereof;
    a generator, mechanically coupled to the turbine, the generator including means for generating an electrical current induced from motion of the turbine; and
    means adapted for directing the naturally occurring gas from the turbine, after passage therethrough, to a predetermined location at a secondary pressure level;
    wherein the means adapted for directing the naturally occurring gas from the turbine comprises:
        means adapted for separating at least one of nitrogen and carbon dioxide from the naturally occurring pressurized gas;
        means adapted for directing the separated at least one of nitrogen and carbon dioxide to a first transmission line; and
        means adapted for directing the naturally occurring pressurized gas to a second transmission line.

2. The system for exploiting power from a pressurized gas reservoir of claim 1, further comprising:
    means adapted for directing gas at the secondary pressure level to an associated combustion so as to generate additional electrical current from combustion thereof.

3. The system for exploiting power from a pressurized gas reservoir of claim 1 wherein the reservoir of naturally occurring gas and the predetermined location are in direct mutual communication.

4. A method for exploiting power from a pressurized gas reservoir comprising the steps of:
    receiving naturally occurring gas that is pressurized at a first pressure level from a reservoir of naturally occurring gas;
    directing the naturally occurring pressurized gas to a turbine so as to induce motion thereof;
    generating, at a generator mechanically coupled to the turbine, an electrical current induced from motion of the turbine; and
    directing the naturally occurring gas from the turbine, after passage therethrough, to a predetermined location, at a secondary pressure level;
    wherein directing the naturally occurring gas from the turbine comprises:
        separating at least one of nitrogen and carbon dioxide from the naturally occurring pressurized gas;
        directing the at least one of separated nitrogen and carbon dioxide to a first transmission line; and
        directing the naturally occurring pressurized gas to a second transmission line.

5. The method for exploiting power from a pressurized gas reservoir of claim 4, further comprising the steps of:
    directing gas at the secondary pressure level to an associated combustion generator so as to generate additional electrical current from combustion thereof.

6. The method for exploiting power from a pressurized gas reservoir of claim 4 wherein the reservoir of naturally occurring gas and the predetermined location are in direct mutual communication.

7. The system for exploiting power from a pressurized gas reservoir of claim 1, further comprising means adapted for using at least a portion of the electrical current to drive an associated compressor, which compressor includes means for increasing the secondary pressure level.

8. The system for exploiting power from a pressurized gas reservoir of claim 1, wherein the predetermined location is a second reservoir.

9. The system for exploiting power from a pressurized gas reservoir of claim 1, wherein the predetermined location is a secondary recovery site.

10. The method for exploiting power from a pressurized gas reservoir of claim 4, further comprising for using at least a portion of the electrical current to drive an associated compressor, which compressor includes means for increasing the secondary pressure level.

11. The method for exploiting power from a pressurized gas reservoir of claim 4, wherein the predetermined location is a second reservoir.

12. The method for exploiting power from a pressurized gas reservoir of claim 4, wherein the predetermined location is a secondary recovery site.

* * * * *